Patented July 24, 1951

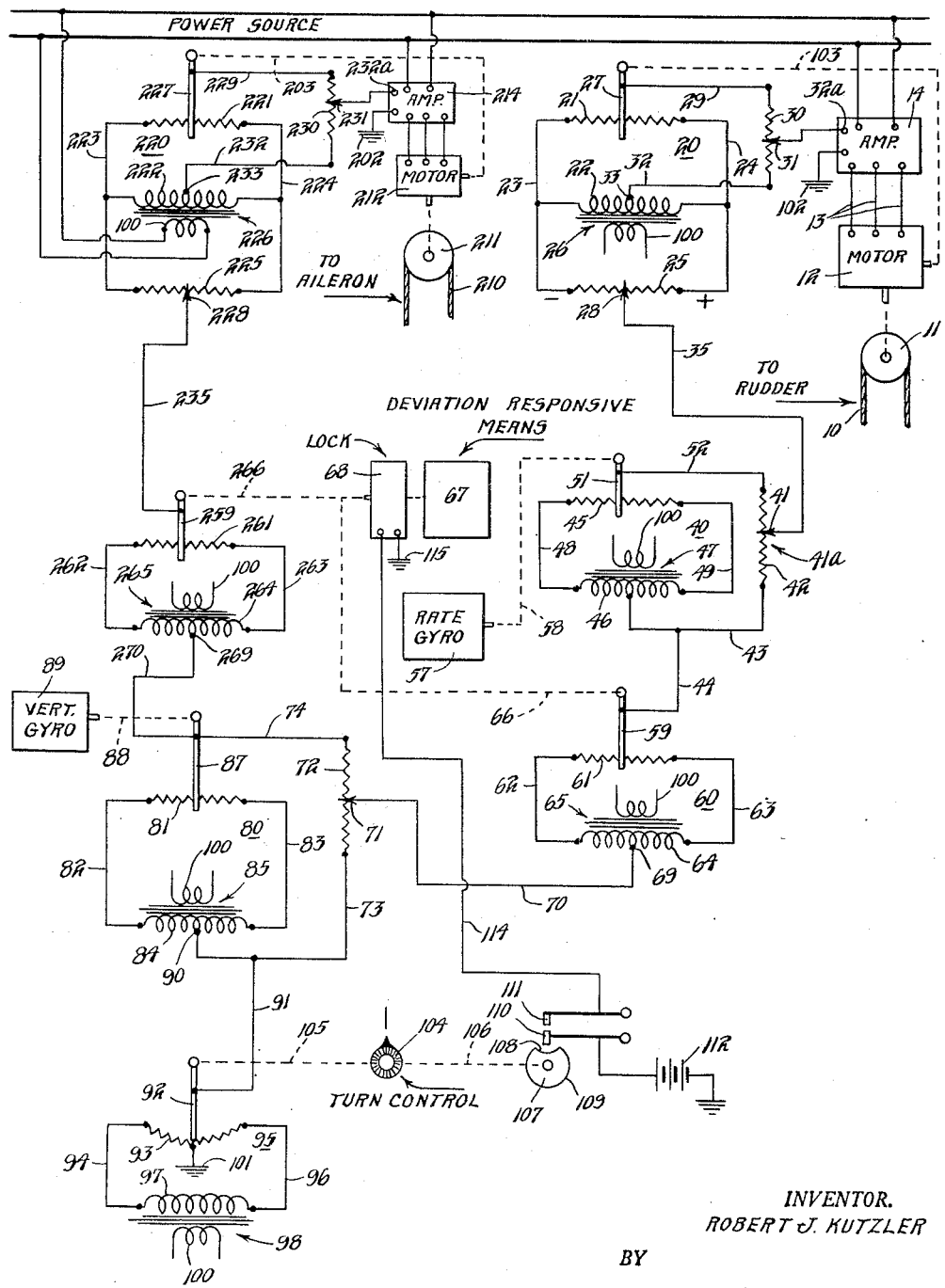

2,561,873

UNITED STATES PATENT OFFICE 2,561,873

FLIGHT CONTROL SYSTEM

Robert J. Kutzler, Minneapolis, Minn., assignor to Minneapolis-Honeywell Regulator Company, Minneapolis, Minn., a corporation of Delaware Application May 3, 1946, Serial No. 666,894

6 Claims. (Cl. 244—77)

This invention concerns an improved flight control system for an aircraft.

An object of this invention is to provide an improved automatic or manually controlled operating means for a control surface of an aircraft in flight.

A further object of this invention is to provide an improved automatic or manually controlled operating means for a control surface of an aircraft in flight in which a control signal as determined by a deviation responsive means or by a manually operated means and which signal is effective to cause movement of an aircraft about an axis, is modified by an additional control signal.

A further object of this invention is to provide an improved automatic or manually controlled operating means for a control surface of an aircraft in flight in which a signal as determined by a deviation responsive means in response to movement of an aircraft or by a manually operated means and which signal is effective to cause movement of an aircraft about an axis, is qualified by an additional signal which is a function of any movement of said aircraft about said axis.

A further object of this invention is to provide an improved automatic or manually controlled operating means for a control surface of an aircraft in flight in which a control signal as determined by a deviation responsive means or by a manually operable means and which signal is effective to cause movement of an aircraft about an axis, is qualified by an additional signal which is a time function of any movement of said aircraft about said axis.

A further object of this invention is to provide a flight control system for an aircraft in which a first electrical signal which is manually selected is utilized to control operation of a control surface of the aircraft and a second electrical signal which is a time function of any movement of the aircraft about an axis is added to said first signal to also control operation of the control surface.

A further object of this invention is to incorporate a rate gyroscope in a flight control apparatus having manually or automatically operated control means. Said apparatus comprises a series of connected networks which are affected by the operation of the control means and the rate gyroscope, the networks governing the operation of a control surface actuating means.

The single figure is a schematic view of a portion of a flight control system.

This invention is concerned primarily with the control of an airplane about its turn axis. The control of the aircraft about the turn axis is effected by the operation of the rudder and ailerons, not shown. The rudder is operated by means of cables 10 which lead from a cable drum 11. The cable drum is driven from a motor 12. The motor 12 may be of any conventional type capable of being reversibly controlled by the output of an amplifier. The motor is connected to the output of an amplifier 14 through leads 13. The amplifier 14 is of any suitable type which is capable of supplying to an output circuit a voltage the phase relationship of which to the phase of a standard source of line voltage is dependent upon and reversible with the signal voltage supplied to the amplifier. The amplifier and motor means for operating the control surfaces may be of the type disclosed in application Ser. No. 447,989, filed June 22, 1942.

The signal for controlling the amplifier 14 is derived from several series connected impedance networks 20, 40, 60, 80, and 95. The signal circuit for amplifier 14 extends from input terminal 32a of the amplifier 14 to wiper 31, impedance network 20, lead 35, wiper 41, impedance network 40, lead 43, lead 44, wiper 59, impedance network 60, lead 70, wiper 71, impedance network 80, lead 73, lead 91, wiper 92, impedance network 95, to ground 101 and to ground 102 of amplifier 14.

The impedance network 20 is in the form of a Wheatstone bridge, two legs of which are formed by a resistor 21 having its ends connected through leads 23 and 24 to the ends of the secondary 22 of the transformer 26, the primary of which is indicated by the reference numeral 100. Since in all of the impedance networks the secondaries may have a common primary, the primaries of the several impedance networks are indicated by the same reference character 100. The primary 100 may be connected to an inverter, not shown, which forms a source of supply for the primaries. The other two legs of the bridge are formed by a resistor 25 which has its ends connected respectively to the ends of the secondary 22. A wiper 28 is positioned to engage the surface of resistor 25. A wiper 27 is positioned to engage the surface of resistor 21. A connection 29 from wiper 27 leads to one end of a resistor 30, the other end of resistor 30 being connected through a lead 32 to a center tap 33 of secondary 22. The wiper 31 is positioned to engage the surface of resistor 30.

If wiper 31 be positioned at the end of resistor 30 which connects with lead 29, the impedance network 20 with respect to amplifier 14 is in the form of a conventional Wheatstone bridge. If the voltage drop along resistor 21 between wiper 27 and lead 23 differs from the corresponding voltage drop along resistor 25 between wiper 28 and lead 23, a voltage signal appears between wipers 27 and 28. This signal voltage may be made to disappear by the adjustment of either wiper to equalize the voltage drops. When no signal voltage exists between the wipers 27 and 28, they may be considered as balanced or centered. Wiper 28 may be adjusted by hand. If wiper 28 be adjusted so that a voltage signal appears across wipers 28 and 27, wiper 27 may in turn be adjusted until no signal appears across the wipers. It is evident, therefore, that the respective positions of the wipers along their resistors with no signal voltage between them may be varied as desired. Resistor 25 and wiper 28 are therefore designated the centering means since they may be manually adjusted to vary the position of no signal voltage or, as stated above, the balance or center position.

The function of the network 20 with respect to amplifier 14 and motor 12 is to provide means to adjust the normal position of the rudder of the aircraft. If the aircraft in flight is continually moving off its desired direction of movement, the rudder may be in improper position. To change this normal rudder position, the amplifier 14 is controlled by a network 20; the other networks are assumed to be in balanced condition. In a half cycle the left ends of resistors 21, 25 may be assumed negative as indicated with respect to their right ends. If wiper 28 be moved toward the left from its balance position, wiper 27 and wiper 31 which is positioned at the junction of resistor 30 and lead 29 will be positive with respect to wiper 28 and thereby set up a signal between them and wiper 28 of a predetermined polarity. Since wiper 28 is connected through the other networks to ground and wipers 27 and 31 are connected to the amplifier input 32a, a signal of a predetermined phase dependent upon the direction of unbalance will be applied to amplifier 14. Amplifier 14 thereupon causes motor 12 to operate in a direction dependent upon the phase of said signal. Motor 12 is connected through a follow-up means 103 to wiper 27 as well as to cable drum 11. When motor 12 operates it positions the cables leading to the rudder as well as operates the follow-up means 103 to position wiper 27 until no signal voltage is derived. The operation of wiper 28 therefore is used to position the rudder either to the right or to the left as desired.

If the wiper 31 be moved from the end of resistor 30 which joins lead 29 toward the end of resistor 30 which joins lead 32, the effect of impedance network 20 on amplifier 14 is modified from the condition originally stated. The potential on wiper 31 and the potential on wiper 28 which is connected to ground 101 and ground 102 of amplifier 14 may be measured with respect to the voltage of the center tap 33 of secondary 22. If wipers 27 and 28 be moved the same amount from their electrical center or balance position on their respective resistors 21 and 25, the amplifier 14 would not be in a balanced or inoperative condition because the potential of wiper 16 is not that of wiper 27 but is different therefrom due to the voltage drop through a portion of resistor 30. Wiper 31 which is connected to amplifier input 32a and wiper 28 which is connected to amplifier ground therefore would not be at a balanced potential and the amplifier 14, due to this unbalance between wipers 31 and 28, would operate. In order that wiper 31 be at the same potential as wiper 28, it is necessary to move wiper 27 a different amount from its electrical center than wiper 28 is displaced from its electrical center. It is therefore seen that if wiper 28 is moved a given amount from its electrical center the amount of movement given to wiper 27 to set up a balance between the voltages on wipers 31 and 28 to render the amplifier 14 inoperative differs from that movement given to wiper 28. The amount of movement given to wiper 27 to effect balance of wipers 31 and 28 depends upon the position which wiper 31 is given with respect to the ends of resistor 30. Resistor 21 and wiper 27 are designated the rebalance potentiometer for the impedance network 20. It is seen that the amount of movement given wiper 27 to restore amplifier 14 to non-operating condition may be varied by the movement of wiper 31 along resistor 30. The rudder is driven through motor 12 whenever wiper 27 is driven. Consequently, the amount of rudder movement given until rebalance is effected by movement of wiper 27 may be varied through the adjustment of wiper 31. Resistor 30 and wiper 31 are therefore designated the ratio means since they may be used to vary the amount of movement given to the rudder for any given signal arising out of the displacement of wiper 28 from its electrical center on resistor 25.

While the ratio resistor 30 and its wiper 31 have been described with respect to the voltage signal set up between wipers 28 and 27, it should be noted that such ratio effect may be applied to any voltage signal derived in the other networks. If wipers 27 and 28 of network 20 are at balanced condition and the voltage signal with respect to ground be applied to wiper 28 of impedance network 20, the network 20 transmits this signal unmodified through lead 29, resistor 30, wiper 31, to amplifier input 32a. This signal operates amplifier 14 and causes motor 12 to position wiper 27 to set up an equal but opposing voltage on wiper 27 with respect to the center tap 33 of secondary 22 as that applied to wiper 28 to initiate operation. However, the voltage between wiper 27 and the center tap 38 passes through resistor 30 and if wiper 31 be positioned away from the junction of resistor 30 and conductor 29, the value of the opposing signal is reduced by the voltage drop in resistor 30 between wiper 31 and the junction. Wiper 27 must therefore move a greater amount due to this voltage drop than if wiper 31 were at the junction.

Thus, it will be seen that the position of wiper 31 on resistor 30 controls the effect of all input signals to the amplifier 14.

Impedance network 20 through its wiper 28 and lead 35 is connected to a wiper 41 of a potentiometer 41a which forms part of network 40. The resistor 42 of the potentiometer has one end connected to a wiper 51 of network 40 and its other end connected through a lead 43 to the center tap of the secondary 46 of impedance network 40. The impedance network 40 comprises a potentiometer having a resistor 45 whose ends are connected through leads 48 and 49 to secondary 46 of a transformer 47 having a primary 100. The wiper 51 is positioned for movement over the surface of resistor 45. The wiper 51 is mechanically connected through an operating means 58 to a rate gyro 57. Wiper 51 may be moved along resistor 45 to select positive or negative voltages with respect to the center tap of secondary 46. This difference of potential is applied to resistor 42. Since wiper 41 may be positioned along resistor 42, it is seen that wiper 41 may select any desired proportion of the difference of potential existing between wiper 51 and the center tap of the secondary 46. The rate gyro which positions wiper 51 may be similar to the type disclosed in Patent 2,365,439 issued December 19, 1944, or Patent 2,246,203 issued June 17, 1941. In this type of rate gyro, the rotor of the gyro is usually mounted on a horizontal axis for rotation within a casing. The casing itself is generally supported on a Cardan ring. The Cardan ring may in turn be supported on a base by means of horizontal trunnions extending from the Cardan ring. The Cardan ring may be biased to a central position by springs which may engage an arm mounted on one of the trunnions. The arm, which is biased through springs to central position, may operate the wiper 51 of impedance network 40 through a mechanical connection 58.

The center tap of secondary 46 of potentiometer 40 is connected through a lead 44 to a wiper 59 of a potentiometer 60. Potentiometer 60 comprises a resistor 61 which has its ends connected through leads 62 and 63 to a secondary 64 of the transformer 65. A wiper 59 which may be moved over the surface of resistor 61 to select positive or negative voltages with respect to center tap 69 has an operating connection 66 leading to a deviation responsive means 67. The deviation responsive means 67 may be a magnetic compass, an earth inductor compass, or a directional gyroscope similar to that disclosed in Patent 2,104,627 issued January 4, 1938. Such a gyroscope may be designated a two degree of freedom gyroscope in which the rotor may be mounted to rotate about a horizontal axis. A supporting means for the rotor in the form of a Cardan ring may be pivoted about a vertical axis. The vertical axis may include an arm which is moved when the craft on which the gyroscope is mounted alters its direction of movement. The arm communicates its motion through a lock 68 and connection 66 to the wiper 59.

The driving connection between the arm of the gyroscope and the wiper 59 may include a frictional clutch, not shown. The lock 68 when actuated serves to hold one side of the frictional clutch but permits the other side to move under the action of the gyroscope. An example of such lock is disclosed in application Ser. No. 447,989, filed June 22, 1942.

A center tap 69 of impedance network 60 is connected through a lead 70 to a wiper 71 of a potentiometer 80. The resistor 72 of the potentiometer has its ends connected to a wiper 87 of a potentiometer 80 and to the center tap 90 of a secondary 84 of the potentiometer 80. Potentiometer 80 has a resistor 81 whose ends are connected through leads 82 and 83 to the secondary 84. The wiper 87 may be moved over the surface of resistor 81 to select positive or negative potentials with respect to the center tap 90. Such potential may be applied across resistor 72 through leads 74 and 75, and it may be seen that wiper 71 may be positioned along resistor 72 to select any portion of the difference of potential arising between wiper 87 and center tap 90. Wiper 87 may be positioned from vertical gyro 89 through a connection 88. The vertical gyro 89 is of the conventional type having a rotor whose axis of rotation is vertical and which is mounted for three degrees of movement. The gyro is so mounted upon the aircraft that movement of the aircraft about its roll axis will cause the gyro to transmit movement through connection 88 to wiper 87. Center tap 90 is connected through a lead 91 to a wiper 92 of a potentiometer 95. The potentiometer 95 has a resistor 93 which has its ends connected through leads 94 and 96 to a secondary 97 of a transformer 98. The wiper 92 may be moved along the surface of resistor 93 by manually operated turn control means 104. The center of resistor 93 is connected to ground. The turn control means 104 which positions wiper 92 also rotates cam 107. The cam 107 has a depressed portion 108 and a circular portion 109. The depressed portion 108 receives a portion of one space contact 110. The other space contact 111 is connected through a lead 114 to lock 68. The contact 110 is connected through a battery 112 to ground. The lock 68 has its return lead 115 connected to ground. It may be seen that whenever turn control 104 is rotated in one direction or the other a circuit is completed to lock 68 energizing the same.

The ailerons, not shown, are positioned through cables 210 which are connected to a drum 211. The drum 211 is driven from a motor 212. This motor 212 is similar to motor 12. The motor 212 is controlled from an amplifier 214 which is similar to amplifier 14. Amplifier 214 is controlled through a series of connected impedance networks 220, 260, 80, and 95. The control circuit for amplifier 214 is from the input terminal 232a, wiper 231, impedance network 220, lead 235, impedance network 260, lead 270, impedance network 80, lead 91, impedance network 95, ground 101, and ground 202 of amplifier 214.

The impedance network 220, like network 20, is in the form of a Wheatstone bridge. Two legs of this bridge are formed by a resistor 221 whose ends are connected through leads 223 and 224 to a secondary 222 of a transformer 226. The other two legs of the bridge are formed by a resistor 225 whose ends are connected through leads 223 and 224 to the ends of secondary 222. A wiper 228 is positioned to contact the surface of resistor 225. A wiper 227 may be positioned along the surface of resistor 221. Wiper 227 through a connection 229 is connected to a resistor 230. The opposite end of resistor 230 is connected through lead 232 to the center tap 233 of secondary 222. A wiper 231 may be positioned along the surface of resistor 230. The wiper 231 is connected to the input 232a of amplifier 214. The other side of the amplifier 214 is connected to ground at 202. The motor 212 which is controlled by amplifier 214 has a follow-up connection 202 for positioning wiper 227. Wiper 228 is connected through a lead 235 to a wiper 259 of an impedance network 260. Impedance network 260 includes a potentiometer whose resistor 261 has its ends connected through leads 262 and 263 to the ends of a secondary 264 of a transformer 265. The wiper 259 through an operating connection 266 is connected to the deviation responsive means 267. The center tap 269 of secondary 264 is connected through a lead 270 to wiper 87 of impedance network 80.

It may be seen that impedance network 220 is similar to impedance network 20 and functions in controlling amplifier 214 in the manner network 20 controls amplifier 14. Its operation may be obtained from a description of the operation of network 20. Similarly, impedance network 260 is in the form of a potentiometer having its secondary connected to a center tap and is therefore similar to impedance network 60. Network 260 operates similarly to network 60.

Operation

Preliminary adjustment of the apparatus is made when the equipment is installed. These adjustments involve networks 80 and 40. It may be seen that the turn control potentiometer 95 and the impedance network 80 which is controlled from the vertical gyro 89 are common to the control networks for both the aileron and rudder. While such control is common, it should be noted that the signal applied to control the rudder from network 80 differs from the signal applied to control the ailerons. The reason for this intercontrol is clarified by a recital of its function. For example, assuming that the aircraft is in level flight with the networks balanced and that the right wing drops. In such case, the vertical gyro 89 sets up a signal in impedance network 80 which causes the operation of amplifier 214 and motor 212 to raise the right wing. A portion of this signal due to the response of the vertical gyro 89 is also fed through resistor 72 and wiper 71 to the control means for the rudder. The reason for applying the signal to the rudder is that if the right wing drops, the plane tends to turn to the right and the signal from the vertical gyro serves to control amplifier 14 and motor 12 to apply left rudder to prevent such turning to the right. Resistor 72 and its wiper 71 are often referred to as the skid potentiometer since wiper 71 is positioned to prevent any skidding which might result from such banking of the plane.

With the wiper 71 adjusted as desired over resistor 72 to prevent skidding, the wiper 41 of network 40 is adjusted with respect to resistor 42 so that when the plane is in a coordinated turn the signal applied to the rudder channel from the vertical gyro and the rate gyro just balances the signal set up by turn control network 95 which positioned the rudder to initiate the turn.

The turn control knob 104 may be positioned so that wiper 92 of network 95 may provide a signal for either a right or left hand turn. This signal is applied full strength to both the aileron and rudder channels. However, as the plane banks due to the resulting displacement of the aileron, the vertical gyro moves the wiper 87 of network 80. The signal provided by network 80 to the aileron channel is sufficient to balance the signal set up by the turn control knob 104. However, only a portion of the signal generated by network 80 is applied to the rudder channel. The portion selected is determined by the position of wiper 71 along resistor 72. It is the general practice to position wiper 71 along resistor 72 so that substantially half of the voltage required to center the follow-up wiper 27 from servomotor 14 is derived from the vertical gyro signal into the rudder channel and half of the voltage signal is derived from the rate gyro in network 40. With the adjustments made the apparatus is ready for flight.

It may be stated that the advantages of the rate gyro in the flight control apparatus are at least twofold. One advantage may be ascertained by assuming the apparatus to be without the rate gyro. It is proposed to have the plane execute a turn by manual control. In such case the wiper 71 would be positioned along resistor 72 so that any signal set up by turn control knob 104 in network 95 and resulting in banking the plane is opposed by an equal signal set up by the operation of vertical gyro 89 in response to the banked position, which is transmitted to the rudder channel. With such an arrangement, operation of the turn control 104 sets up a signal in the rudder channel and aileron channel of equal strength. The aileron servomotor 212 positions the aileron and also positions its follow-up wiper 227 to set up an equal but opposing signal to that set up by network 95. At the same time, the motor 12 drives the rudder in accordance with the signal input and also drives its follow-up means 103 to position wiper 27 to set up an equal but opposing voltage to the signal input from turn control means 104. The plane responds to the aileron applied and banks. The vertical gyro 89 responds to the bank and sets up a signal equal to and opposing that set up by network 95 from the turn control means 104. This causes the aileron servomotor 212 to position the ailerons in normal or center position. At the same time, the follow-up means from motor 212 positions its follow-up wiper 227 at its electrical center. The signal derived from network 80 due to the movement of vertical gyro 89 is also applied equally to the rudder channel. This causes the motor 12 to drive the rudder to normal position and also centralizes the follow-up wiper 27. It should be noted that the operation of the turn control means 104 also energizes the lock 68 which prevents the transmission of movement from the deviation responsive means to either the aileron or rudder channel. As the plane approaches the desired direction of flight, the turn control means 104 is moved toward normal position. The movement of wiper 92 toward normal position sets up a signal opposite to that which it set up due to its initial movement. The aileron and rudder servos therefore give their respective control surfaces opposite movement from that which was originally applied to them and also displace their wipers from normal position. This opposite aileron tends to cause a lessening in the banking angle of the plane. The lessening of the banking angle causes the vertical gyro signal to become less and again causes the servomotors to center their wipers and control surfaces. However, the displacement of the wiper 87 from its normal position determines the direction of rotation of the servomotors 212 and 12 at this time. The signal causes the motors to rotate in such a direction that the vertical gyro tends to position the wiper 87 toward normal position. In other words, the signal arising out of the displacement of wiper 87 from its normal position causes the motors 212 and 12 to position their control surfaces. The position is such as to effect a decrease in the bank angle, and the vertical gyro 89 consequently moves the wiper 87 toward normal position. As wiper 92 continues toward normal position, the servomotors apply rudder and aileron but the vertical gyro acts to cause the servos to center their wipers and control surfaces. The action is continuous until the plane is level.

The action will now be considered with the rate gyro 57 incorporated in the apparatus and wipers 41 and 71 properly adjusted. It is assumed that the plane is to be turned to the right. The turn control knob 104 is turned to the right thereby displacing wiper 92 of network 95. Such signal derived from network 95 is applied full strength to the aileron and rudder channels. The respective servomotors 212 and 12 of the aileron and rudder operating means position their control surfaces.

It is well known that a plane may be turned most quickly under the dual control of ailerons and rudder. While the aileron and rudder may be placed in neutral position after the turn is initiated, a rapid turn may be effected better through the coaction of the rudder with the ailerons during the initial part of the turn. It would be desirable to continue to maintain rudder until the plane is actually in a turn. In the operation of the turn control means without the rate gyro, the rudder and aileron were centered upon response of the vertical gyro 89 to the bank of the plane. The present arrangement is a considerable improvement over the turn control without a rate gyro since the rudder is not centered unless the plane is actually in a turn.

The plane goes into a right bank under the influence of the right aileron. At the same time, the plane begins to turn under the effect of the right rudder. The bank of the plane causes the vertical gyro 89 to respond to this bank and moves wiper 87 to set up a signal in network 80 equal to that initiated by turn control means 104. The ailerons are therefore centered. Since only a portion of the signal set up in network 80 by the movement of wiper 87 is applied to the rudder channel, and since this signal is less than that set up by turn control means 104, the rudder is not centered by the vertical gyro signal applied to the rudder channel. If the plane is actually turning, however, the rate gyro sets up a signal on network 40 through the operating linkage 58 adjusting wiper 51. This signal is sufficient to cause the centering of the rudder and wiper 27. However, it should be noted that if the signal is insufficient, rudder is still maintained until the plane actually goes into the right turn desired. This is a very desirable arrangement in having an element which responds to the actual turning of the plane control the centering of the rudder completely. This is a guarantee that the plane is actually in a turn. As the plane approaches the desired heading, the turn control knob 104 is moved toward normal position. The vertical gyro has positioned wiper 87 so that it calls for left aileron and left rudder. At the same time, the rate gyro has positioned wiper 51 of impedance network 40 so that the signal set up by the wiper displacement calls for left rudder operation. The aileron and rudder signals being unbalanced due to the return movement of turn control 104 are applied to their respective servomotors 212 and 12. The motor 212 applies left aileron which decreases the angle of bank of the plane. The rudder motor 12 applies left rudder. The plane continues to turn under the influence of its banked position. The application of the left aileron has decreased the angle of bank so that the vertical gyro moves the wiper 87 toward normal position. This causes the servomotor 212 to center the aileron. The further movement of turn control 104 again causes the application of left aileron. The vertical gyro responding to decreased bank again causes motor 212 to center the aileron. The action is continuous so that the plane gradually moves toward level position. The movement toward level position has an effect in the rudder channel similar to that in the aileron channel with the added signal from the rate gyro. If when the plane reaches level position it is not turning, the rate signal also decreases to zero and the rudder and wiper 27 are in neutral position.

The rate gyro is also of considerable aid in stabilizing a plane for flight in a desired direction. The flight control apparatus is under the control of the directional gyro and the rate gyro when the plane is stabilized in flight in a particular direction. The deviation responsive means 67 will position wiper 59 of network 60 through linkage 66 when the flight of the plane deviates from a desired direction. At the same time this directional gyro through its connection 266 displaces the wiper 259 of network 260. Network 260 applies a signal to the aileron channel. The displacement of wiper 59 of the rudder channel is the same irrespective of the speed of deviation. In other words, the magnitude of the displacement of wiper 59 is the same whether the deviation be rapid or slow. The amount of movement which motor 12 applies to the rudder is dependent upon the magnitude of the signal applied to amplifier 14. If the deviation of the plane be abrupt it is desired that a large signal be applied to amplifier 14 so that a large rudder movement will be obtained quickly. Such large signal cannot be derived from the deviation responsive network 60. The rate gyro 57 through its network 40 supplements the deviation signal with a velocity signal. If the deviation is slow, the velocity signal from network 40 will be small since the rate gyro 57 responds to the rate of turning of the aircraft.

The interrelation between the deviation responsive means 67 and the rate gyro 57 therefore becomes apparent. The rate gyro alone could not be used to stabilize the plane in a desired direction of flight since it is not responsive to slow deviations. On the other hand, the deviation responsive means 67 will sense such slow deviations. The combination of these two gyros therefore effects the desired stabilized direction of flight. It is also evident why the vertical gyro 89 is involved in the operation of the rudder. In slow deviations from a desired direction of movement only the directional gyro 67 responds to a change. In turning the plane back on its course, it is desired to operate the plane in a coordinated turn. Such turn is effected by the application of rudder and aileron to the airplane to control its return to the desired direction. It is necessary therefore for the deviation responsive means 67 to control the ailerons as well as the rudder. In order to center the control surfaces after the plane is in the turn, it is necessary to depend on the vertical gyro to not only centralize the ailerons but also to apply a signal to the rudder channel to centralize the rudder.

The operation will be considered when the plane is stabilized in a desired direction only through the deviation responsive means 67 and without the rate gyro 57. Wipers 41 and 71 are properly adjusted. If the plane be blown sharply to the left off its desired heading, the deviation responsive device 67 responds to the change in heading. The means 67, in responding, positions wiper 59 of the rudder network 60 to the right calling for a right rudder. At the same time, the means 67 positions wiper 259 of network 260 calling for right aileron. The servomotors respond to the signal and position the aileron and rudder respectively for a right hand turn and displace their wipers 27, 227 from center position to balance the signal input. The plane now responds to the movement of its aileron and banks. The vertical gyro 89 now responds to the bank and positions wiper 87 calling for left aileron and also left rudder. The servomotors in response to the signal from the vertical gyro center their respective wipers 27, 227 and the rudder and aileron are therefore centered. The plane now turns under the effect of the right bank of the plane. As the plane is turning toward the right, the deviation signal becomes less. In other words, wiper 59 moves to the left and wiper 259 moves to the left. Wiper 87, however, is in the position calling for left aileron and left rudder, and its signal exceeds the signal derived from the respective positions of wiper 59 in the rudder channel and wiper 259 in the aileron channel. The servomotors 12 and 212 therefore apply left rudder and left aileron. The plane which is in a right bank responds to the left aileron and decreases the value of the right bank. The vertical gyro therefore moves its wiper 87 slightly to the right from its leftward position. This sets up an unbalanced signal in the networks causing servos 12, 212 to center their wipers and control surfaces. The deviation signal decreases still further as the plane approaches its desired heading. This leaves an unbalance signal under the control of the position of wiper 87 and this left signal again calls for left aileron and left rudder. The servomotors apply left aileron and left rudder to decrease the right bank of the plane still further, which again causes centering of servo wipers and control surfaces. The action is continuous so that when the plane reaches its desired heading the plane is level and the rudder and aileron are in center position. In the above recited operation, the value of the rudder displacement was solely proportional to the magnitude of the deviation. The turn is not achieved as quickly as it would be were the rudder positioned not only in accordance with the deviation signal but also in accordance with a velocity signal.

The operation of the apparatus will be considered when a rate gyro functions with the deviation responsive means in stabilizing an aircraft in a particular direction of flight. In a general analysis of the operation it may be stated that the rate gyro reinforces the signal from the directional gyro in the initial movement of the plane toward its desired heading. As the plane approaches the desired heading, however, the rate gyro signal is opposed to the deviation signal. The position of the rudder is determined from the algebraic sum of the signals derived from the position of the follow-up wiper 27 in its network 20, the position of the wiper 51 of the rate gyro in its network 40, the position of the wiper 59 from the deviation responsive means in its network 60, and the position of the wiper 87 operated by the vertical gyro in its network 80. The algebraic sum of these signals derived from the networks must equal zero. The deviation signal may vary from a large plus value to a zero value. The signal from the rate gyro may be considered plus initially and minus near the end of the application of the correction. The vertical gyro signal varies from a large negative value to a zero value. The follow-up wiper 27 has a positive or negative value depending upon the algebraic sum of the other three values. In other words, at times it may have a plus value and at times it may have a negative value. In view of the fact that the operation is continuous, that is, the voltages are being continually balanced, the values of the signals depart from their initial values. An attempt will be made to set down in detail the operative steps insofar as the operation of four continuously variable interrelated quantities can be set down. Assume that the plane is blown sharply to the left off its course. The deviation responsive means 67 and the rate gyro 57 respond to this abrupt turning of the plane. The directional gyro positions wiper 59 to call for a right rudder. It also positions wiper 259 to call for a right aileron. The rate gyro also responds and calls for a right rudder. The servomotor 12 responds to the signal set up by means 67 and by rate gyro 57 and applies right rudder. The servomotor 212 responds to the deviation signal and applies right aileron. The motors also position their follow-up wipers to the left to balance the right signals set up by the deviation responsive means 67 and the rate gyro 57 in one case and the deviation signal in the other. The application of the right aileron causes the plane to tilt. The vertical gyro 89 responds to this tilting of the plane and sets up a signal calling for left rudder and left aileron. Since the voltage may be considered unbalanced to the left, the amplifiers control their respective servomotors 212 and 12. The aileron is centered as is also its follow-up wiper. However, the rudder is not centered because the signal from the rate gyro and the deviation responsive means 67 exceed the value of the rudder signal derived from vertical gyro 89 and network 80. Now it should be realized that the value of the deviation is increasing at this time whereas the value of the rate gyro signal is decreasing. When the effect of the right bank of the plane overcomes that due to that applied from the outside air, the plane begins to turn toward its desired heading. The plane may be said to be in a reverse curve at this time. The plane is in its maximum right bank at this point. When the plane is in such position, the rate gyro signal decreases to zero since the plane's rate of turning is changing from a plus value to a minus value through this point. As the plane heads toward its desired direction under the influence of its banked position, the rate gyro signal opposes the deviation signal. As the deviation signal becomes less, the banked position of the plane as in previous operations described becomes less. Finally, as the plane reaches its desired heading, the aircraft is flying level, the ailerons are in normal position, and the aileron networks are in balance condition. If the plane is steady on its course, the rate gyro signal is zero and the rudder is centered and its network is balanced. If the plane is still turning, the rate gyro holds a left rudder to offset the turning action.

It has now been shown that this invention provides a means for generating a velocity signal. This velocity signal generating means provides a factor which not only provides better stabilized turns of the aircraft which are initiated by hand but also provides an aid to stabilize automatically the direction of flight of an aircraft.

I claim as my invention:

1. Control apparatus for an aircraft comprising: two control surface motor means; separate means for controlling the movement of each said motor means; a plurality of adjustable signal producing devices; means for combining the signals from said devices and connected to each control means; manual actuating means adapted to adjust one device to provide a signal to effect operation of both said motor means; means responsive to the movement of said aircraft about one axis resulting from the operation of one motor means and adapted to adjust a second device to provide an opposite signal to control the two motor means; and means responsive to the movement of the aircraft about the other axis resulting from the movement of the other control surface to adjust a third device in the control means for said last control surface motor means.

2. Control apparatus for an aircraft having two control surfaces, each of said control surfaces controlling the movement of said aircraft about one of two respectively perpendicular axes, said apparatus comprising: motor means for positioning each said control surfaces; a plurality of signal voltage producing devices each having a part fixed to the aircraft and an adjustable part; a control means for each motor means and responsive to signals from some of said devices; manually actuable means adapted to adjust one device for both control means to effect operation of both said motor means; follow up means operated by each said motor means for adjusting a device for its control means; means responsive to the movement of said aircraft about one axis resulting from the operation of one motor means and adapted to adjust a device for both control means to control both motor means; and means responsive to the movement of the aircraft about the other axis to adjust a device for one control means to control the motor means for the other control surface.

3. Control apparatus for an aircraft having two control surfaces for controlling the aircraft, each said control surface controlling the movement of the aircraft about one of two respectively perpendicular axes, said apparatus comprising: a motor means for positioning each of said control surfaces; individual means for controlling each said motor means and each control means being responsive to a control signal; a plurality of adjustable voltage sources connected in electrical series relation to form two control circuits, one circuit being connected to each control means; manually actuable means for adjusting a first voltage source for each circuit thereby controlling the operation of said motor means; follow up means operated by each said motor means to adjust a voltage source in each circuit for overcoming the effect of the voltage source adjusted by the said manual actuated means; means responsive to the movement of the aircraft about one axis resulting from the operation of one motor means and adapted to adjust a voltage source in each circuit to additionally control both motor means; and means responsive to the movement of the aircraft about said other axis to adjust a voltage source in one circuit to further control the operating means for said other control surface.

4. In apparatus for controlling the direction of flight of an aircraft having aileron and rudder control surfaces for positioning said craft about a horizontal and vertical axis, said apparatus comprising: motor means for operating said ailerons; motor means for operating said rudder; a separate control means for each motor means; a plurality of adjustable control signal producing devices; means for combining the signals from said devices and connected to each control means; manually actuable means to adjust one device common to each combining means to provide a signal to effect operation of both motor means; craft roll responsive means adapted to adjust a second control device common to each combining means to provide a signal opposed to said manual signal; and means responsive to rate of movement of said craft about the vertical axis for adjusting a third control device in the combining means for said rudder surface motor means.

5. In apparatus for controlling the direction of flight of an aircraft having aileron and rudder control surfaces for positioning said craft about a horizontal axis and vertical axis thereof, said apparatus comprising: motor means for operating said ailerons; motor means for operating said rudder; a separate control means for each motor means; a plurality of adjustable control signal producing devices; means for combining the signals from said devices and connected to each control means; manually actuable means to adjust one device common to each combining means to provide a signal to effect operation of both motor means to cause said craft to turn and bank about said vertical and horizontal axes; craft roll responsive means adapted to adjust a second control device common to each combining means to provide a signal opposed to said manual signal whereby said motor means and the control surfaces are returned toward original positions; means to modify the effect of said second control device adjustment in said rudder combining means to modify the relative position of said ailerons and rudder to coordinate the bank and rate of turn of the craft; and means responsive to rate of movement of said craft about the vertical axis for adjusting a third control device in the combining means for said rudder surface motor means.

6. In apparatus for controlling the direction of flight of an aircraft having aileron and rudder control surfaces for positioning said craft about a horizontal and vertical axis, said apparatus comprising: motor means for operating said ailerons; motor means for operating said rudder; a separate control means for each motor means; a plurality of adjustable control signal producing devices; means for combining the signals from said devices and connected to each control means; manually actuable means to adjust one device common to each combining means to provide a signal to effect operation of both motor means; craft roll responsive means adapted to adjust a second control device common to each combining means to provide a signal opposed to said manual signal; means responsive to rate of movement of said craft about the vertical axis for adjusting a third control device in the combining means for said rudder surface motor means to stabilize the rate of turn of said craft; and means for modifying the effect of the adjustment of said third control device to vary the rate of turn stabilized.

ROBERT J. KUTZLER.

REFERENCES CITED

The following references are of record in the file of this patent:

UNITED STATES PATENTS

| Number | Name | Date |
|---|---|---|
| 2,159,142 | Fischer | May 23, 1939 |
| 2,190,390 | Thiry | Feb. 13, 1940 |
| 2,234,326 | Tiebel | Mar. 11, 1941 |
| 2,283,754 | Mathews | May 19, 1942 |
| 2,293,889 | DeFlorez | Aug. 25, 1942 |
| 2,351,977 | Kronenberger et al. | June 20, 1944 |
| 2,387,795 | Isserstedt | Oct. 30, 1945 |
| 2,398,421 | Frische et al. | Apr. 16, 1946 |
| 2,401,168 | Kronenberger | May 28, 1946 |
| 2,463,362 | Doll | Mar. 1, 1949 |
| 2,464,629 | Young | Mar. 15, 1949 |